(12) United States Patent
McElroy et al.

(10) Patent No.: US 9,240,599 B2
(45) Date of Patent: Jan. 19, 2016

(54) AMMONIA OR HYDRAZINE INJECTION INTO FUEL CELL SYSTEMS

(75) Inventors: James McElroy, Suffield, CT (US); Arne Ballantine, Palo Alto, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 704 days.

(21) Appl. No.: 13/603,581

(22) Filed: Sep. 5, 2012

(65) Prior Publication Data

US 2014/0065499 A1    Mar. 6, 2014

(51) Int. Cl.
*H01M 8/04* (2006.01)
*H01M 8/06* (2006.01)
*H01M 8/22* (2006.01)

(52) U.S. Cl.
CPC ...... *H01M 8/04082* (2013.01); *H01M 8/04097* (2013.01); *H01M 8/04208* (2013.01); *H01M 8/0662* (2013.01); *H01M 8/222* (2013.01); *Y02E 60/50* (2013.01)

(58) Field of Classification Search
CPC ............ H01M 8/222; H01M 8/04082; H01M 8/04208; H01M 8/04097; H01M 8/12
See application file for complete search history.

(56) References Cited

U.S. PATENT DOCUMENTS

| | | | |
|---|---|---|---|
| 6,924,053 B2 | 8/2005 | McElroy | |
| 7,811,442 B2 | 10/2010 | Holbrook et al. | |
| 7,833,668 B2 | 11/2010 | Ballantine et al. | |
| 7,883,803 B2 | 2/2011 | McElroy et al. | |
| 2006/0251935 A1* | 11/2006 | Barrett et al. | 429/22 |
| 2007/0044657 A1* | 3/2007 | LaVen et al. | 95/96 |
| 2007/0178338 A1 | 8/2007 | McElroy et al. | |
| 2007/0207351 A1 | 9/2007 | Christensen et al. | |
| 2007/0259242 A1* | 11/2007 | Schaevitz et al. | 429/34 |
| 2008/0057359 A1 | 3/2008 | Venkataraman et al. | |
| 2008/0241612 A1 | 10/2008 | Ballantine et al. | |
| 2008/0241638 A1 | 10/2008 | McElroy et al. | |
| 2009/0053569 A1 | 2/2009 | Perry et al. | |
| 2009/0151560 A1* | 6/2009 | Adams et al. | 95/96 |
| 2010/0239924 A1 | 9/2010 | McElroy et al. | |
| 2011/0008687 A1* | 1/2011 | Ballantine et al. | 429/410 |
| 2011/0281185 A1 | 11/2011 | Sridhar et al. | |

OTHER PUBLICATIONS

Patel et al., "Co-Production of Electricity and Hydrogen Using NH3-Fueled SOFC Systems," Presentation at Ammonia Fuel Conference, Oct. 2006, Golden, CO.

(Continued)

*Primary Examiner* — Zachary Best
(74) *Attorney, Agent, or Firm* — The Marbury Law Group PLLC

(57) ABSTRACT

A fuel cell system includes a controller, a fuel cell stack, a fuel inlet conduit operatively connected to the fuel cell stack, the fuel inlet conduit adapted to receive fuel from a fuel supply, a recycling conduit operatively connecting the fuel cell stack to the fuel inlet conduit, the recycling conduit adapted to recycle a portion of a fuel exhaust stream from the fuel cell stack to the fuel inlet conduit, and an ammonia or hydrazine storage vessel operatively connected to the fuel inlet conduit via a valve coupled to the controller. The controller is configured to control the operation of the valve to provide ammonia or hydrazine from the ammonia or hydrazine storage vessel into the fuel inlet conduit upon detecting a change in the fuel from the fuel supply.

21 Claims, 1 Drawing Sheet

(56) References Cited

OTHER PUBLICATIONS

Dekker et al., "Highly Efficient Conversion of Ammonia in Electricity by Solid Oxide Fuel Cells," Presentation at 6th European Solid Oxide Fuel Cell Forum, Jun. 28-Jul. 2, 2004, Lucerne, Switzerland.

J. Ganley, "Ammonia: The Key to a Hydrogen Economy—Ammonia Fuel Cell Systems," Howard University, Department of Chemical Engineering, 2005.

U.S. Appl. No. 13/606,765, James McElroy et al., "Ammonia Fueled SOFC System," filed Sep. 7, 2012, Specification and drawings.

* cited by examiner

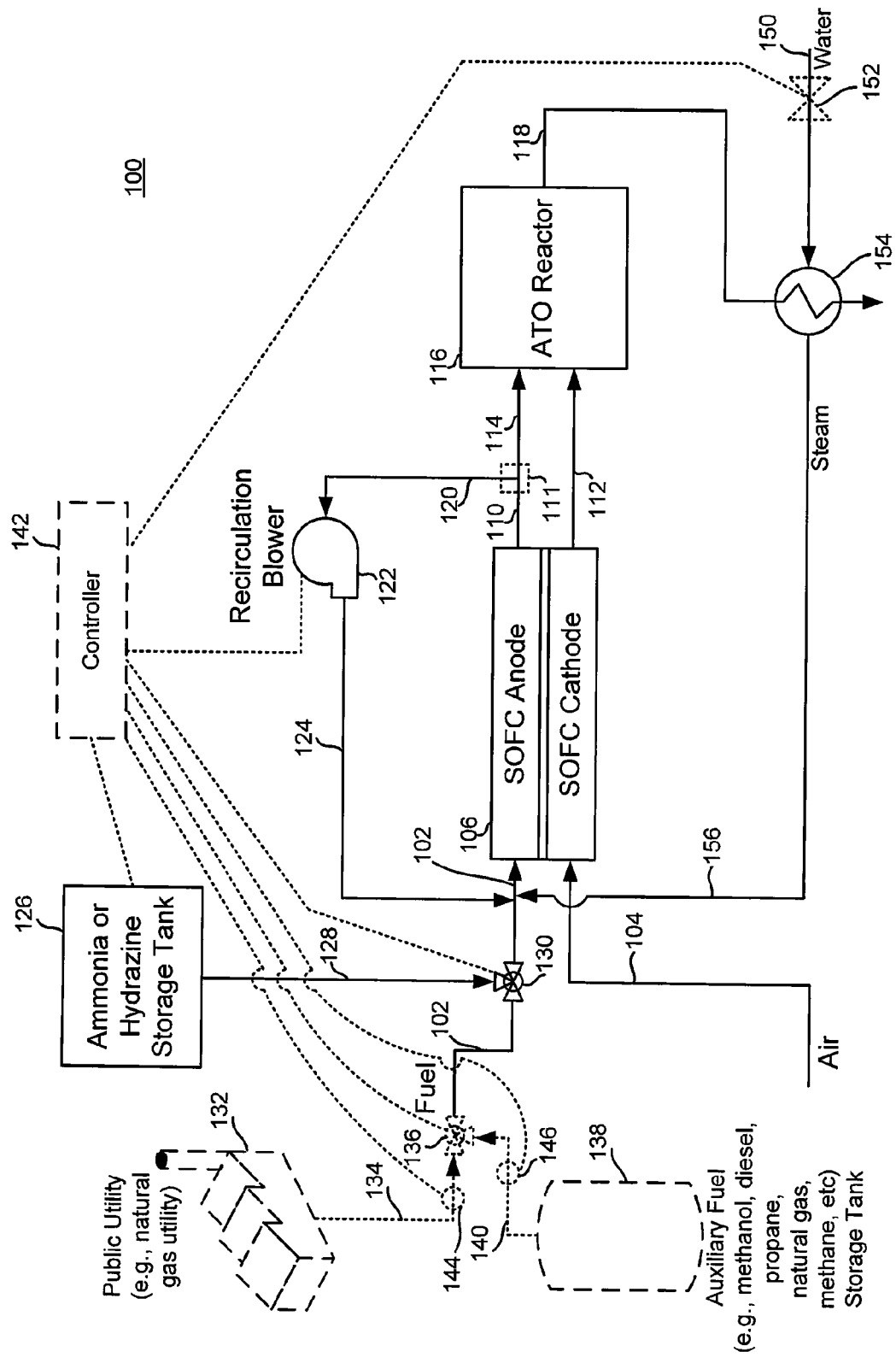

AMMONIA OR HYDRAZINE INJECTION INTO FUEL CELL SYSTEMS

BACKGROUND

The present invention relates generally to the field of fuel cell systems and more particularly to fuel cell systems using ammonia, hydrazine and/or methanol fuel injections.

Fuel cells are electrochemical devices which can convert energy stored in fuels to electrical energy. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

Fuel cells may be used as primary and/or backup power sources for critical electrical systems. Typically, natural gas provided from public utilities or other sources is the fuel source for the fuel cells. On occasion, especially in cold weather, public utilities may inject propane and air into the natural gas pipeline to make up for shortages in natural gas (i.e., "peak shaving"). The new natural gas mixture created by injected propane and air (i.e., "peak shaving fuel") may cause coking and possible damage to the fuel cells. Additionally, during emergencies, such as natural disasters, the public utilities may be offline, and natural gas may not be available as a fuel source.

Alternatively, fuel cells may use liquid fuels, such as propane, diesel, liquid natural gas, liquid methane, etc, provided from on-site liquid storage, to generate electricity. However, the use of liquid fuels, such as propane or diesel, may reduce the efficiency of the fuel cells.

SUMMARY OF THE INVENTION

One embodiment of the invention provides a fuel cell system which includes a controller, a fuel cell stack, a fuel inlet conduit operatively connected to the fuel cell stack, the fuel inlet conduit adapted to receive fuel from a fuel supply, a recycling conduit operatively connecting the fuel cell stack to the fuel inlet conduit, the recycling conduit adapted to recycle a portion of a fuel exhaust stream from the fuel cell stack to the fuel inlet conduit, and an ammonia or hydrazine storage vessel operatively connected to the fuel inlet conduit via a valve coupled to the controller. The controller is configured to control the operation of the valve to provide ammonia or hydrazine from the ammonia or hydrazine storage vessel into the fuel inlet conduit upon detecting a change in the fuel from the fuel supply.

Another embodiment of the invention provides a method of operating a fuel cell system, comprising providing a fuel inlet stream into a fuel inlet of a fuel cell stack, providing air into an air inlet of the fuel cell stack, operating the fuel cell stack to generate electricity and a fuel exhaust stream, recycling the fuel exhaust stream to the fuel inlet, and providing ammonia or hydrazine into the fuel inlet upon detecting a change in the fuel inlet stream.

BRIEF DESCRIPTION OF THE DRAWING

FIG. 1 is a schematic of fuel cell system according to an embodiment of the present invention.

DETAILED DESCRIPTION OF THE EMBODIMENTS

The embodiments of the invention illustrate how liquid fuels, such as ammonia, hydrazine, or methanol may be used with a fuel cell system, such as a solid oxide fuel cell system. It should be noted that other fuel cell systems, such as molten carbonate systems, may also be used. In an embodiment, the liquid fuels, such as methanol, ammonia and/or hydrazine, may be stored on-site. In an embodiment, the liquid fuels, such as ammonia and/or hydrazine, may be injected into a natural gas fuel inlet stream during peak shaving events. In an embodiment, liquid fuels, such as methanol, may be used as a backup fuel supply upon the loss of a primary natural gas fuel inlet stream of a high temperature fuel cell stack. The injection of liquid fuels, such as methanol, ammonia and/or hydrazine, into the fuel inlet stream of a high temperature fuel cell stack may avoid coking and damage to the high temperature fuel cell stack, as well as increase high temperature fuel cell stack efficiency.

FIG. 1 illustrates a fuel cell system 100 according to embodiments of the present invention. Preferably, the system 100 is a high temperature fuel cell stack system, such as a solid oxide fuel cell (SOFC) system. The system 100 may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100 includes a high temperature fuel cell stack 106. The stack may include a plurality of SOFCs or SORFCs. The high temperature fuel cell stack 106 is illustrated schematically to show one solid oxide fuel cell of the stack containing a ceramic electrolyte, such as yttria or scandia stabilized zirconia, an anode electrode, such as a nickel-stabilized zirconia and/or ceria cermet, and a cathode electrode, such as lanthanum strontium manganite. Each fuel cell contains an electrolyte, an anode electrode on one side of the electrolyte anode chamber, a cathode electrode on the other side of the electrolyte in a cathode chamber, as well as other components, such as separator plates (e.g., interconnects)/electrical contacts, fuel cell stack housing (e.g., hot box), insulation, and balance of plant components, such as blowers, heat exchangers, etc. In an SOFC operating in the fuel cell mode, the oxidizer, such as air or oxygen gas, enters the cathode chamber, while the fuel, such as hydrogen or hydro-carbon fuel, enters the anode chamber. Any suitable fuel cell designs and component materials may be used.

The system 100 may further include an anode tail gas oxidizer (ATO) reactor 116, a recirculation blower 122, a valve 130, and an ammonia or hydrazine storage vessel (e.g., tank or another similar container) 126. In an optional embodiment, the system 100 may be supplied fuel, such as natural gas, from a public utility 132 via a natural gas pipeline 134. In an additional optional embodiment, the system 100 may be supplied liquid or gas fuel, such as methanol, diesel, propane, natural gas, methane, etc, from an auxiliary fuel storage vessel (e.g., tank or another similar container) 138 via a fuel supply conduit 140. In an optional embodiment, the supply of fuel from the pipeline 134 and/or fuel supply conduit 140 may be regulated by an optional valve 136. In a further optional embodiment, a controller 142, such as a processor or microcontroller, may be provided to monitor and/or control the operation of the system 100. The controller 142 may be coupled to the recirculation blower 122 and may control the operation of the recirculation blower 122. The controller 142 may be coupled to the valve 130 and may control the operation of the valve 130. The controller 142 may be coupled to the ammonia or hydrazine storage tank 126 and may monitor its status, such as fuel level, fuel flow rate, and/or fuel composition/quality, of the ammonia or hydrazine fuel. The controller 142 may be coupled to optional sensors 144, 146, such as fuel flow rate and/or fuel composition/quality sensors, to monitor the fuel flow in pipeline 134 and/or fuel supply conduit 140, respectively. Alternatively, a single sensor may be located in conduit 102 instead. The controller 142 may be coupled to optional valve 136 and may control the operation of the valve 136. While illustrated as a three-way valve, valve 136 may be any other type valve, such as a two way valve (e.g., two two way vales, one in fuel supply conduit 140 and one in pipeline 134). Additionally, while valves 130 and 136 are illustrated at the junctions of various fuel supply conduits, one of ordinary skill in the art would understand that in line valves in each conduit itself could control the flow of fuel from the various sources to the fuel cell stack 106 (e.g., replace valve 130 with valves in fuel supply conduit 140 and fuel supply conduit 128).

In an embodiment, the system 100 may operate using natural gas supplied from the public utility 132 via the pipeline 134. Natural gas may be a compilation of various gases, such as methane, ethane, propane, nitrogen, carbon dioxide, oxygen, butane, pentane, hexanes, hydrogen, and/or other trace gases. The percentage of the various gases comprising natural gas may vary. A standard mixture of natural gas may comprise approximately 94% methane, 3% ethane, 0.2% propane, 1.3% nitrogen, 1% carbon dioxide, 0.1% oxygen, 0.1% butane, 0.1% pentane, 0.1% hexanes, and 0.1% hydrogen. On occasion, especially in cold weather, the public utility 132 may inject propane and air into the natural gas pipeline 134 to make up for shortages in natural gas (i.e., "peak shaving"). As an example, during peak shaving the pipeline 134 may contain a new natural gas mixture, such as 75% natural gas and 25% propane and air. In general, in a peak shaving event, the volume percent of methane in the natural gas changes by 5% or more, for example, it decreases by 5-30%, such as 15-20%. The new natural gas mixture created by injected propane and air (i.e., "peak shaving fuel") may cause coking and possible damage to the fuel cell stack 106. Additionally, during emergencies, such as natural disasters, the public utility 132 may be offline, and natural gas may not be available as a fuel source.

The natural gas from the pipeline 134 may be provided into the fuel cell stack 106 through fuel inlet conduit 102. In an embodiment, a sensor 144 may monitor the flow rate and/or composition/quality of the gas within the pipeline 134 and may provide flow rate and/or composition/quality data to the controller 142. The controller 142 may use the flow rate and/or composition/quality data to control the operation of valve 136. In this manner, the amount of natural gas from the pipeline 136 provided to the fuel cell stack 106 may be controlled. In an alternative embodiment, manual flow rate and/or composition/quality measurements of the pipeline and/or manual operation of the valve 136 may be used to control the amount of natural gas from the pipeline 136 provided to the fuel cell stack 106. While illustrated as a three-way valve at the intersection of the pipeline 136 and the fuel inlet conduit 102, a two way valve prior to the fuel inlet conduit 102 may also control the flow of natural gas from the pipeline 134 to the fuel inlet conduit 102. The fuel inlet conduit 102 provides the fuel inlet stream to the anode side of the fuel cell stack 106.

Air or another oxygen containing gas is provided into the stack 106 through an air inlet conduit 104 using an air blower or similar component. The air inlet conduit 104 provides air to the cathode side of the fuel cell stack 106.

Once the fuel and oxidant are provided into the fuel cell stack 106, the stack 106 is operated to generate electricity and a fuel exhaust stream. The fuel exhaust stream may contain hydrogen, water vapor, carbon monoxide, carbon dioxide, some un-reacted hydrocarbon gas, such as methane, and other reaction by-products and impurities.

The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. The fuel exhaust conduit 110 is configured to provide a portion of the fuel exhaust stream to the ATO reactor 116 via ATO input conduit 114 and recycle a portion of the fuel exhaust stream via recycling conduit 120 using an optional splitter or valve 111. The portion of fuel exhaust provided to the ATO reactor 116 and recycled via recycling conduit 120 may vary. For example 10%-90% of the fuel exhaust may be provided to the ATO reactor 116 and 90%-10% recycled. For example, 50% of the fuel exhaust may be provided to the ATO reactor 116, while 50% is recycled. Additionally, 90% of the fuel exhaust or more may be provided to the ATO reactor, while 10% or less is recycled. The amount of recycled fuel provided into conduit 120 is controlled by blower 122 power or blowing speed. In an embodiment, the blowing speed of the blower 122 may be monitored and/or controlled by the controller 142. In another embodiment, the blowing speed of the blower 122 may be monitored and/or controlled manually. The fuel exhaust stream provided into conduits 114 and 120 may contain the same composition or content of hydrogen, carbon monoxide, water, and carbon dioxide. Air exhaust conduit 112 is configured to provide the air exhaust stream to the ATO reactor 116.

The ATO reactor 116 receives the fuel exhaust stream and air exhaust stream via ATO input conduit 114 and conduit 112, respectively. The ATO reactor uses the combined fuel exhaust stream and air exhaust stream to oxidize anode tail gas and output heated oxidized fuel (i.e., reactor exhaust) to ATO exhaust conduit 118.

A recirculation blower 122 is coupled to recycling conduit 120 to provide the recycled fuel exhaust stream from recycling conduit 120 to recycling conduit 124. The recirculation blower 122 may be computer and/or operator controlled and may vary the amount and/or rate of the recycled fuel exhaust stream being provided to the recycling conduit 124 and also the amount and/or rate of the recycled fuel exhaust stream being provided back to the stack 106. As such, the recirculation blower 122 may be used to increase or decrease the overall recycling rate in system 100. The recycled fuel exhaust stream is provided back to the fuel inlet stream in the fuel inlet conduit 102 for the fuel stack 106 via recycling conduit 124. The recycling of fuel exhaust to the fuel cell stack 106 may control the steam to carbon ratio in the fuel inlet stream for methane reforming. The anode exhaust recirculation rate may be increased to increase the steam to carbon ratio in the fuel inlet stream.

When the public utility 132 injects propane and air into the natural gas pipeline 134 to make up for shortages in natural gas (i.e., "peak shaving"), the system 100 must react quickly to the new natural gas mixture to avoid coking and possible damage to the system 100. A response to avoid coking and possible damage to the system 100 may be to increase the water content at the steam reforming sites by increasing the steam to carbon ratio in the fuel inlet stream to the anode side of the fuel cell stack 106. In an embodiment, the water content may be increased by increasing the water flow into the system 100 via a water supply conduit 150 which may provide water to a heat exchanger 154 (e.g., evaporator). Heat exchanger 154 may use heat from ATO exhaust conduit 118 to heat the water from water supply conduit 150 to generate steam and the steam may be provided from the heat exchanger 154 to the fuel inlet conduit 102 via steam conduit 156. In an embodiment, valve 152 may be coupled to controller 142 and the controller 142 may open and/or close valve 152 to increase the water flow into the system 100 via the water supply conduit 150.

In an embodiment, during peak shaving, the water containing anode exhaust recirculation rate may be increased to increase the steam to carbon ratio to avoid coking and avoid possible equipment damage. However, the increased anode exhaust recirculation rate may reduce the efficiency of the fuel cell stack 106 due to the Nernst voltage impact caused by lowered fuel partial pressure.

In an embodiment, during peak shaving, ammonia and/or hydrazine stored in the ammonia or hydrazine storage tank 126 may be injected into the fuel inlet conduit 102 to supply the needed increase in the steam to carbon ratio while maintaining the high efficiency of the fuel cell stack 106. Fuel supply conduit 128 may be coupled to the ammonia or hydrazine storage tank 126 and the fuel inlet conduit 102. Valve 130 may control the flow of ammonia and/or hydrazine from the ammonia or hydrazine storage tank 126 to the fuel inlet conduit 102. In operation, when the peak shaving conditions (e.g., at least 5 volume percent decrease in methane content of natural gas fuel) are detected in the natural gas pipeline 134 (for example by sensor 144), valve 130 may be opened to provide ammonia and/or hydrazine from the ammonia or hydrazine storage tank 126 to the fuel inlet conduit 102, thereby injecting ammonia and/or hydrazine into the peak shaving gas mixture. The ammonia and/or hydrazine injected into the peak shaving gas mixture may produce about twice the water as methane without adding to the amount of carbon in the fuel inlet stream because the reaction of ammonia and/or hydrazine in solid oxide fuel cells produces water without producing carbon oxides. Additionally, the valve 130 may be controlled to reduce the flow rate of the peak shaving gas mixture because the increased heating value of the injected ammonia and/or hydrazine may maintain the system 100 efficiency with less peak shaving gas mixture.

In an embodiment, valve 130 may be positioned by the controller to close all ammonia or hydrazine flow through conduit 128 into conduit 102 during steady state operation except for during peak shaving events. Thus, the controller is configured to control the operation of the valve to provide no ammonia or hydrazine in steady state mode and to provide a non-zero amount of ammonia or hydrazine into the fuel inlet conduit upon detecting the change in the fuel supply.

In another embodiment, valve 130 may be positioned in the open configuration during steady state operation of system 100 to allow a first amount of ammonia or hydrazine to flow from conduit 128 into conduit 102, but the controller may open the valve further during peak shaving events to increase the flow of ammonia and/or hydrazine during peak shaving events, such that a second amount of ammonia or hydrazine, which is greater than the first amount, flows from conduit 128 into conduit 102.

In an alternative embodiment, during peak shaving and/or during a complete loss of the natural gas supplied from the public utility 132 (e.g., a complete loss of natural gas resulting from a natural disaster such as an earthquake or a volcano), ammonia and/or hydrazine from the on-site ammonia or hydrazine storage tank 126 and/or methanol from the auxiliary fuel storage tank 138 may be used as a backup fuel supply for the fuel cell stack 106. Methanol may be advantageous as a back-up fuel supply because methanol has a high level of compatibility with fuel cell systems designed for natural gas fueling, methanol is a liquid at normal atmospheric conditions, methanol is low cost, and unpressurized methanol storage equipment is lower cost than pressurized storage equipment. In an embodiment, if the peak shaving and/or complete loss of the natural gas supplied from the public utility 132 extends beyond the fuel storage capacity of the ammonia or hydrazine storage tank 126 and/or the auxiliary fuel storage tank 138 the ammonia, hydrazine, and/or methanol in the on-site ammonia or hydrazine storage tank 126 and/or auxiliary fuel storage tank 138 may be refilled by local delivery of ammonia, hydrazine, and/or methanol, such as by a fuel truck delivery.

In another alternative embodiment, the ammonia or hydrazine are provided into the fuel inlet stream during change in the fuel inlet stream that is caused by an event other than a peak shaving event. For example, the ammonia or hydrazine are provided into the fuel inlet stream (e.g., a natural gas inlet stream) in response to an increase in ethane or olefin content in the natural gas inlet stream. Such an increase may occur during a local injection of ethane and/or a refinery olefin off-gas, such as ethylene and/or propylene, into the natural gas stream provided in a natural gas pipeline.

In an embodiment, the system 100 may operate using liquid or gas fuel (e.g., diesel, propane, natural gas, methane, etc) supplied from an on-site auxiliary fuel storage tank 138. In an embodiment, the auxiliary fuel supplied from the auxiliary fuel storage tank 138 may serve as a backup fuel to augment the natural gas supplied from the public utility 132. In an alternative embodiment, the liquid fuel supplied from the auxiliary fuel storage tank 138 may be the primary fuel supplied to the fuel cell stack 106 and no natural gas from the public utility 132 may be used. In an embodiment, the auxiliary fuel storage tank 138 may be coupled to the fuel inlet conduit 102 via a fuel supply conduit 140 and valve 136.

Liquid fuel from the auxiliary fuel storage tank 138 may be provided into the fuel supply conduit 140. Liquid fuel from the fuel supply conduit 140 may be provided into the fuel cell stack 106 through fuel inlet conduit 102. In an embodiment, a sensor 146 may monitor the flow rate and/or composition/quality of the liquid fuel within the fuel supply conduit 140 and may provide flow rate and/or composition/quality data to the controller 142. The controller 142 may use the flow rate and/or composition/quality data to control the operation of valve 136. In this manner, the amount of liquid fuel from the fuel supply conduit 140 provided to the fuel cell stack 106 may be controlled. In an alternative embodiment, manual flow rate and/or composition/quality measurements of the fuel supply conduit and/or manual operation of the valve 136 may be used to control the amount of liquid fuel from the fuel supply conduit 140 provided to the fuel cell stack 106.

In an embodiment, when liquid fuels (such as propane or diesel) are used as the primary fuel to the fuel cell stack 106, ammonia and/or hydrazine may be injected into the liquid fuel to increase the steam to carbon ratio in the fuel inlet stream to the anode side of the fuel cell stack 106. In operation, valve 130 may be opened to provide ammonia and/or hydrazine from the ammonia or hydrazine storage tank 126 to the fuel inlet conduit 102, thereby injecting ammonia and/or hydrazine into the liquid fuel. The ammonia and/or hydrazine injected into the liquid fuel may provide the extra steam to increase the steam to carbon ratio. Additionally, the ammonia and/or hydrazine may reduce the necessary flow rate of the liquid fuel because the increased heating value of the injected ammonia and/or hydrazine may maintain the system 100 efficiency with less liquid fuel. In an embodiment, injection of ammonia and/or hydrazine may be used with increased anode exhaust recycling and/or the addition of extra water to offset peak shaving fuel changes and keep the steam to carbon ration in a desired range.

The fuel cell systems described herein may have other embodiments and configurations, as desired. Other components, such as fuel side exhaust stream condensers, heat exchangers, heat-driven pumps, turbines, additional gas separation devices, hydrogen separators which separate hydrogen from the fuel exhaust and provide hydrogen for external use, fuel processing subsystems, fuel reformers and or water gas shift reactors, may be added if desired. Furthermore, it should be understood that any system element or method steps described in any embodiment and/or illustrated in any figure may also be used in systems and/or methods of other suitable embodiments described above even if such use is not expressly described.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The foregoing description of the invention has been presented for purposes of illustration and description. It is not intended to be exhaustive or to limit the invention to the precise form disclosed, and modifications and variations are possible in light of the above teachings or maybe acquired a practice of the invention. The description was chosen in order to explain the principles of the invention and its practical application. It is intended that the scope of the invention as defined by the claims appended hereto, and their equivalents.

The invention claimed is:

1. A fuel cell system, comprising:
   a controller;
   a fuel cell stack;
   a fuel inlet conduit operatively connected to the fuel cell stack, the fuel inlet conduit adapted to receive fuel from a fuel supply;
   a recycling conduit operatively connecting the fuel cell stack to the fuel inlet conduit, the recycling conduit adapted to recycle a portion of a fuel exhaust stream from the fuel cell stack to the fuel inlet conduit;
   a composition sensor configured to detect a change in the composition of the fuel provided to the fuel inlet conduit; and
   an ammonia or hydrazine storage vessel operatively connected to the fuel inlet conduit via a valve coupled to the controller,
   wherein the controller is configured to control the operation of the valve to mix ammonia or hydrazine from the ammonia or hydrazine storage vessel with the fuel in the fuel inlet conduit, when the composition sensor detects a change in the composition of the fuel from the fuel supply.

2. The fuel cell system of claim 1, wherein fuel cell stack comprises a solid oxide fuel cell stack, the fuel supply is a natural gas pipeline and the fuel comprises natural gas.

3. The fuel cell system of claim 2, wherein the composition sensor is configured to detect whether the natural gas has a standard mixture or a peak shaving mixture.

4. The fuel cell system of claim 3, wherein:
   the controller is configured to control the operation of the valve to provide no ammonia or hydrazine from the ammonia or hydrazine storage vessel into the fuel inlet conduit, when the composition sensor detects the standard mixture; and
   the controller is configured to control the operation of the valve to provide a non-zero amount of ammonia or hydrazine into the fuel inlet conduit, when the composition sensor detects the peak shaving mixture.

5. The fuel cell system of claim 3, wherein the peak shaving mixture has 5 to 30 volume percent less methane than the standard mixture.

6. The fuel cell system of claim 3, wherein the fuel cell system further comprises a flow rate sensor configured to detect a flow rate of the fuel provided to the fuel inlet conduit.

7. The fuel cell system of claim 6, wherein the controller is configured to provide an auxiliary fuel from an auxiliary fuel vessel to the fuel inlet conduit when the flow rate sensor detects a decrease or interruption in the flow rate of the fuel is detected.

8. The fuel cell system of claim 7, wherein the auxiliary fuel vessel comprises a methanol vessel and the auxiliary fuel comprises methanol.

9. The fuel cell system of claim 1, further comprising a fuel flow rate sensor which is in communication with the controller and which is located in at least one of the fuel inlet conduit and a conduit which connects the fuel supply to the fuel inlet conduit.

10. A method of operating a fuel cell system, comprising:
    providing a fuel inlet stream into a fuel inlet of a fuel cell stack;
    providing air into an air inlet of the fuel cell stack;

operating the fuel cell stack to generate electricity and a fuel exhaust stream;

recycling the fuel exhaust stream to the fuel inlet; and providing ammonia or hydrazine in addition to the fuel inlet stream into the fuel inlet upon detecting a change in composition of the fuel inlet stream.

11. The method of claim 10, wherein fuel cell stack comprises a solid oxide fuel cell stack, and the fuel inlet stream comprises natural gas.

12. The method of claim 11, wherein the detecting of the change in the composition of the fuel inlet stream comprises detecting whether the natural gas has a standard mixture or a peak shaving mixture.

13. The method of claim 12, wherein:

no ammonia or hydrazine is provided into the fuel inlet when the natural gas is detected to have the standard mixture during steady state operation of the fuel cell stack; and a non-zero amount of ammonia or hydrazine is provided into the fuel inlet upon detecting the change in composition of the fuel inlet stream from the standard mixture to the peak shaving mixture.

14. The method of claim 12, wherein the peak shaving mixture has 5 to 30 volume percent less methane than the standard mixture, and providing the ammonia or hydrazine in addition to the fuel inlet stream into the fuel inlet comprises injecting ammonia or hydrazine into the peak shaving gas mixture.

15. The method of claim 12, further comprising detecting a flow rate of the fuel provided to the fuel inlet.

16. The method of claim 15, further comprising providing an auxiliary fuel to the fuel inlet when a decrease or interruption in the flow rate of the fuel inlet stream is detected.

17. The method of claim 16, wherein the auxiliary fuel comprises methanol.

18. The method of claim 11, wherein the change in the fuel inlet stream composition comprises an increase in ethane or olefin content in the natural gas inlet stream.

19. The method of claim 10, wherein detecting a change in the composition of the fuel inlet stream-comprises using a composition sensor to sense the change in composition of the fuel inlet stream.

20. The method of claim 10, wherein providing ammonia or hydrazine comprises providing the ammonia.

21. The method of claim 10, wherein providing ammonia or hydrazine comprises providing the hydrazine.

* * * * *